Oct. 15, 1957  S. DOWSE ET AL  2,809,421
MACHINE FOR SECURING IN POSITION A LABYRINTH STRIP
Filed Jan. 4, 1954  6 Sheets-Sheet 3

Oct. 15, 1957    S. DOWSE ET AL    2,809,421
MACHINE FOR SECURING IN POSITION A LABYRINTH STRIP
Filed Jan. 4, 1954    6 Sheets-Sheet 4

Oct. 15, 1957 S. DOWSE ET AL 2,809,421
MACHINE FOR SECURING IN POSITION A LABYRINTH STRIP
Filed Jan. 4, 1954 6 Sheets-Sheet 6

2,809,421

MACHINE FOR SECURING IN POSITION A LABYRINTH STRIP

Sidney Dowse, Coventry, England, and Maurice Sevik, Toronto, Ontario, Canada, assignors to Armstrong Siddeley Motors Limited, Coventry, England Application January 4, 1954, Serial No. 402,083

Claims priority, application Great Britain January 6, 1953

5 Claims. (Cl. 29—200)

This invention relates to a machine for securing a labyrinth strip, by means of a length of wire, in an undercut groove of a component.

The labyrinth strip is preformed along its appropriate edge to be of channel section, with one flange longer than the other, to be received in the groove of the component and to receive the wire, and the present method of securing it is by manually hammering the wire, usually through the intermediary of a chisel, whilst the component is intermittently traversed by the operator until the whole length of the wire has been peened in this way, thereby forcing the channel section part of the strip into intimate contact with the walls of the groove.

This is a very lengthy and tedious operation, as well as being a very delicate one; and the main object of the invention is to provide a machine which will do this work, thus effecting a considerable economy.

The machine, according to the invention, includes a peening roller adapted to engage the wire in the channel part of the strip when the latter is in the groove, means for vibrating the roller with respect to the component to provide a hammering effect on the wire, and means for effecting a relative traversing movement between the roller and the component so that the whole length of the wire can be peened in this way.

Preferably, the traversing movement is effected by rotating the component. Preferably, too, the roller is always maintained in contact with the wire during the peening operation.

A further feature of the invention consists in providing a guide adjacent the peening roller for the length of wire and labyrinth strip.

Figure 1:
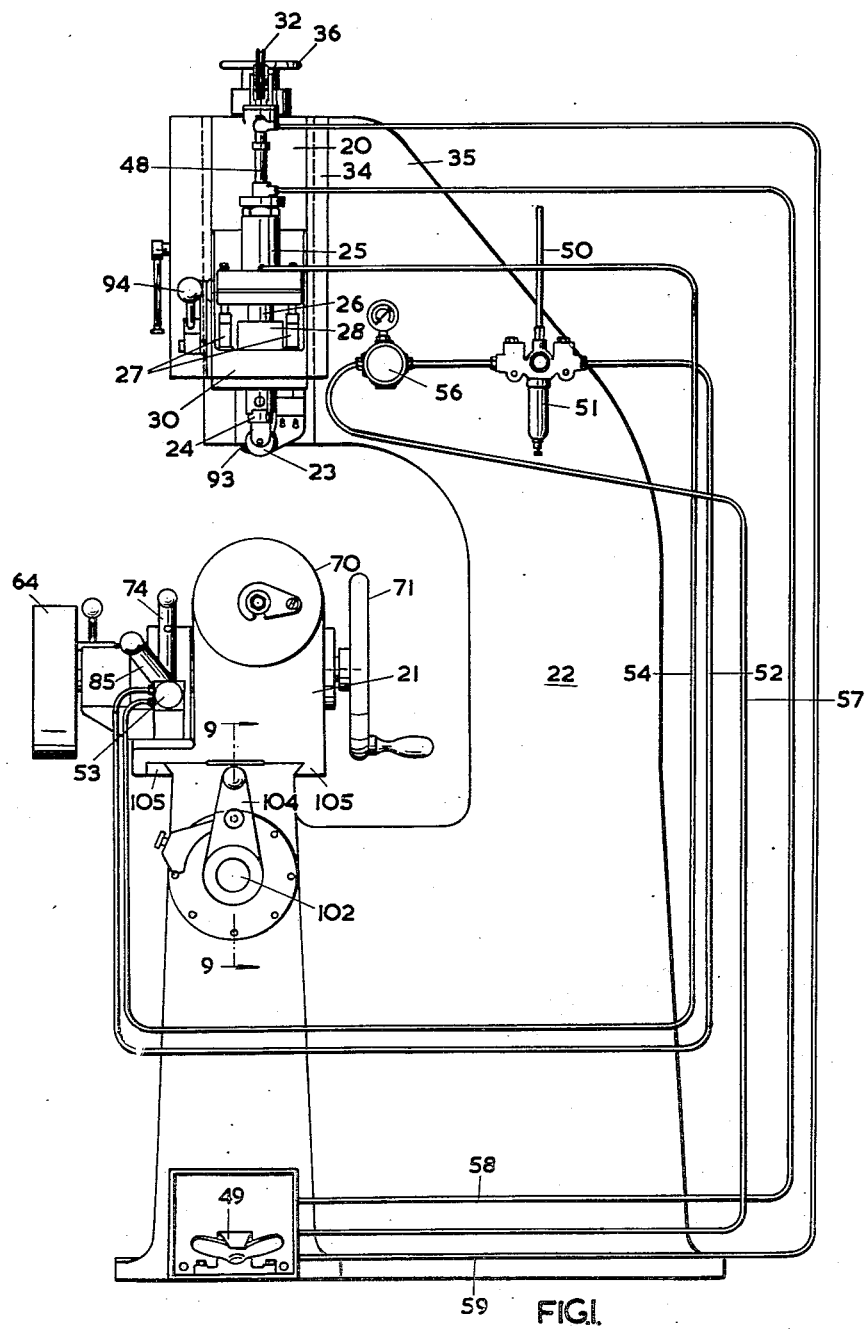
Figure 1 is a front elevation of a machine according to the invention.

The construction of machine shown in the drawings includes a tool head unit 20, a work-holding unit 21, and a base 22 supporting both these units. The tool head unit includes the peening roller 23, this being supported by a vertical shank 24 at right angles to the axis of the roller. Associated with the shank is a pneumatic vibrator 25 of a kind known per se.

The vibrator is connected with the shank by means of a ram 26 which is supported by two resilient mountings 27, for example, of the kind consisting of two brackets joined by a bonded block of rubber or other resilient material, which serves to damp vibrations between the vibrator and the machine, the ram being guided by a part 28 of the tool head unit.

The parts of the tool head unit as thus described are carried by a vertically-movable slide 30 which is counterbalanced, by means of a predominating weight 31 (Figures 3 and 4), pulley 32 and cable 33, to rise to an inoperative position.

As will be well understood, provision is made for adjusting these parts, when setting up, in any usual manner, for example, and as shown, by the vertically movable slide 30 being mounted on a normally fixed but vertically adjustable slide 34 on a supporting head 35 carried by the base, leaving a movement of the vertical slide 30 of the order of, say, two inches.

Figure 3:
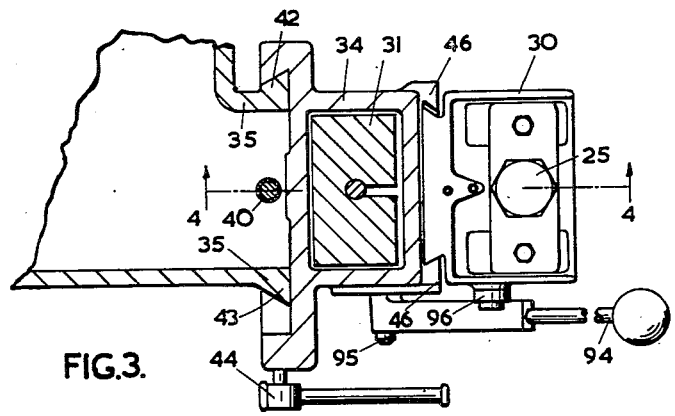
Figure 3 is a sectional plan of a tool head unit of the machine, the section being on the line 3—3 of Figure 2.
Figure 4:
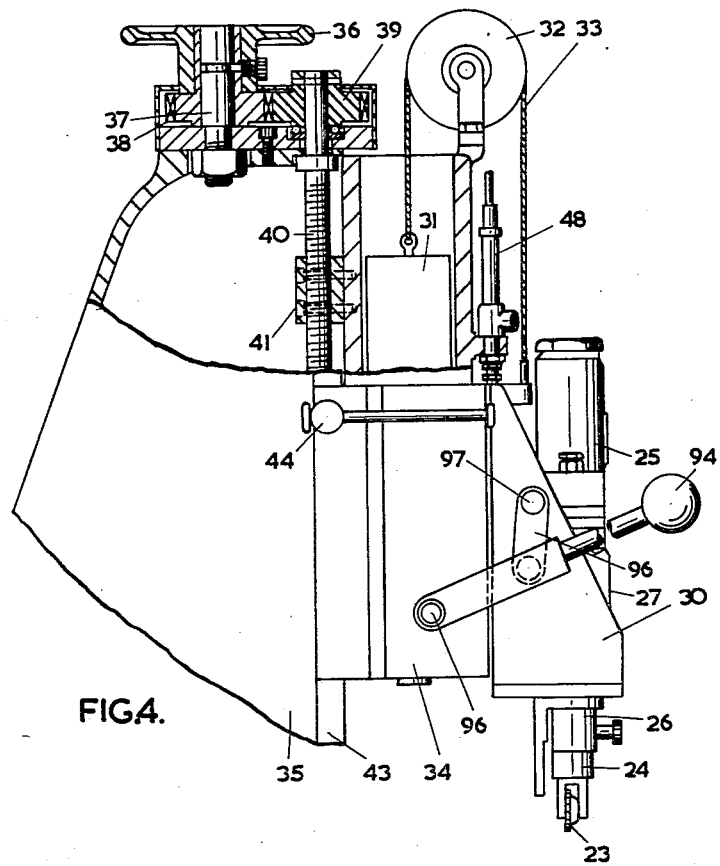
Figure 4 is a part-sectional elevation of the tool head unit, the section being on the line 4—4 of Figure 3.

Figures 3 and 4 show in detail the arrangements for the adjustment of the slides 30 and 34, in which a hand-wheel 36 is rotatably mounted on a spindle 37. The hand-wheel has a driving connection with a gear 38 meshing a gear 39 fast with a vertical, screw-threaded shaft 40. Coacting with the screw-threaded shaft 40 is a nut 41 rigidly secured to the slide 34, the slide being mounted on dovetail guides 42, 43, as shown more clearly by Figure 3, and having a conventional clamping arrangement 44 for locking the slide in an adjusted position. Thus, it will be seen that with the clamp 44 moved to its unlocking position the slide 34 can be adjusted vertically by actuation of the hand-wheel 36 to adjust the slide 30 relatively to the component.

The slide 34 has a hollow interior to receive the weight 31 and has at its side, remote from the guides 35, dovetailed guides 46 for the slide 30.

The slide 30 can be moved downwardly by means of an air cylinder 48. A conveniently placed foot-operated valve 49 for the air cylinder 48 is mounted on the base 22 and connected with the air cylinder so that in one position of the valve the peening roller will be forced down into engagement with the work, whereas in the other position the slide is free to rise under the pull of the weight, and may, if desired, be assisted in this respect by the air cylinder.

The pneumatic circuits of the machine are shown in detail in Figure 1, in which air under pressure is delivered from a mains pipe 50 to a pressure regulating valve 51 and thence, by way of a pipe line 52, a control valve 53, and pipe line 54 to the vibrator 25, to supply the vibrator with the full mains pressure when the valve 53 is appropriately actuated. The compressed air is also supplied to a pressure reducing valve 56 and by means of a pipe 57 to the foot-operated valve 49 which selectively supplies the air pressure to a pipe line 58 or a pipe line 59, the pipe lines 58, 59 being connected to opposite ends of the air cylinder 48, which is mounted on the slide 34 and acts on the slide 30.

Figure 5:
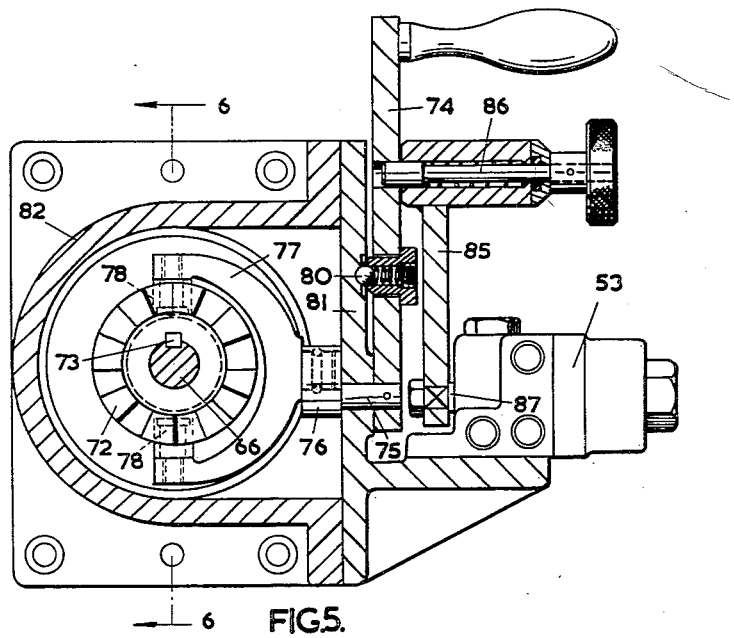
Figure 5 is a section on the line 5—5 of Figure 6 and shows the arrangement of a control for a drive to a component holding jig and a control for the pneumatic vibrator.
Figure 6:
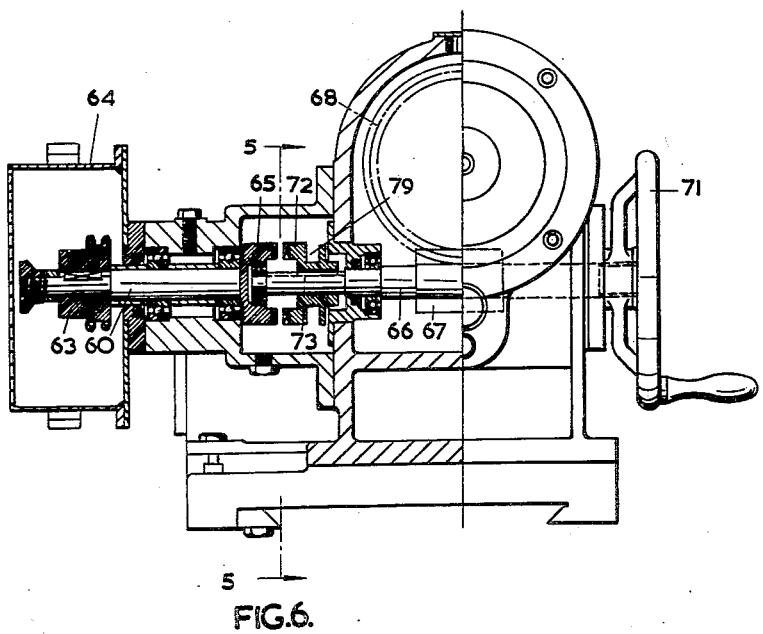
Figure 6 is a part-sectional elevation on the line 6—6 of Figure 5.

The work-holding unit 21 includes a rotatable motorised fixture which, as will be seen from Figures 5 and 6, has a shaft 60 driven from a variable-speed motor 61 (Figure 2) by means of a chain 62 (Figure 2) passed over a sprocket 63 enclosed in a casing 64. At the remote end of the shaft 60 is a dog clutch member 65 having mounted coaxially therein a bearing for the support of one end of a shaft 66 having a worm gear 67 meshing with a worm wheel 68 by means of which a jig 69, holding the component 70, can be rotated. The shaft 66 has, at its end remote from the dog clutch, a hand-wheel 71 by means of which the shaft can be manually rotated for setting up purposes. The movable member 72 of the dog clutch is splined at 73 to the shaft 66. Its position axially of the shaft is adjusted by means of a hand lever 74. The latter is mounted on a stub shaft 75 having an off-set arm 76 which carries a C-shaped jaw 77, at the ends of the arm of which are rollers 78 for engaging in a groove 79 of the member 72. For locating the hand lever 74 in either of its two extreme positions a spring-pressed ball 80 is provided, the ball being received in recesses (not shown) in a closure plate 81 of a casing 82 for the dog clutch.

As it is normally desired to operate the vibrator 25 simultaneously with the engagement of the dog clutch, the hand lever 74 is connected to an arm 85, to be operated in unison therewith, by means of a spring-pressed plunger 86 which can be withdrawn if desired so that the hand lever 74 and arm 85 can be independently operated. The arm 85 is shown keyed to a shaft 87 which governs the position of the control valve 53, which valve may be of any known construction.

Figure 7:
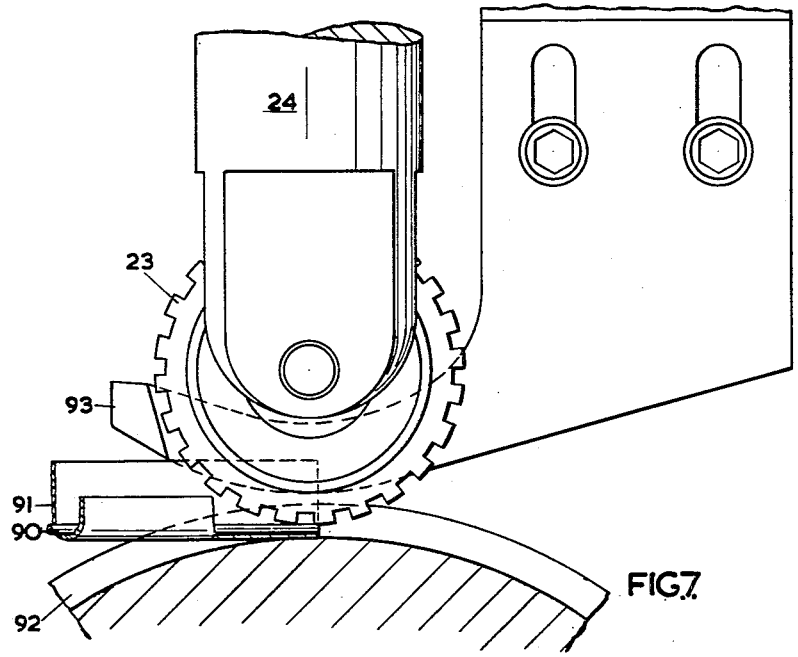
Figures 7 and 8 are diagrams showing the position of the peening roller, labyrinth strip and wire in the groove of the component.
Figure 8:
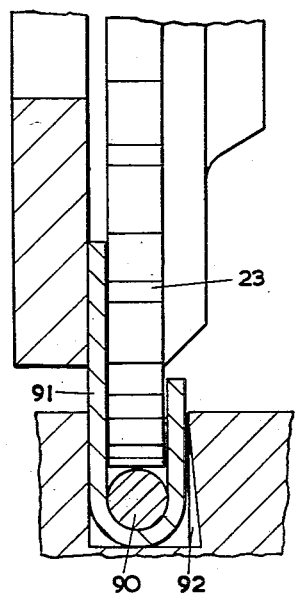

In carrying out the invention, coacting ends of a length of wire 90 (Figures 7 and 8) and of a preformed labyrinth strip 91 are placed in the groove 92 beneath the roller 23, a finger 93, carried by the vertical slide 30 and disposed at one side of the roller, guiding the strip into and locating it in correct position in the groove. The slide 30 is then initially hand-operated to move it and the roller gradually into the operative position so as gently to feed the roller into contact with the wire after which the pedal-actuated valve 49 is operated finally to hold the beginning of the wire and strip in their correct positions in the groove, as shown in Figures 7 and 8, prior to the peening operation. It is helpful, at this stage, in order to initiate the attachment of the wire and labyrinth strip to the component, momentarily then to actuate the vibrator by operating the arm 28 only.

For manually moving the roller 23 towards the work a lever 94 is provided, the lever being pivoted at 95 to the slide 34 and having a link 96 pivoted to it intermediate its length, the other end of the link being pivoted to the slide 30 at 97.

The machine is now ready to commence the peening operation, and the lever 74 and arm 85 are operated to establish a drive to the jig 69 and component 70 and to actuate the vibrator. A convenient speed for the component is a peripheral speed of about twelve inches per minute. Obviously, provision will be made for adjusting the speed.

When approximately 90% of the labyrinth strip and wire have been inserted in this way, and the wire peened to secure the strip, the machine may be stopped to prevent the "beginning" of the strip and wire from fouling the un-used portion of the strip, and the latter and the un-used wire are then cut to the required length for finishing. Thereupon the machine is restarted to complete the cycle. Obviously, if necessary, the machine may have to be again stopped in order to trim the ends of the wire and strip.

When the operation has been completed the pedal-operated valve 49 is actuated in the other direction to allow the tool-holding slide 30 to be raised.

It is usual for a number of labyrinth strips to be fitted side-by-side one another in a component, and for this reason provision is preferably made in the work-holding unit for a movement of the fixture (and with it the component) and associated parts in order to bring another groove of the component into the operative position.

Figure 2:
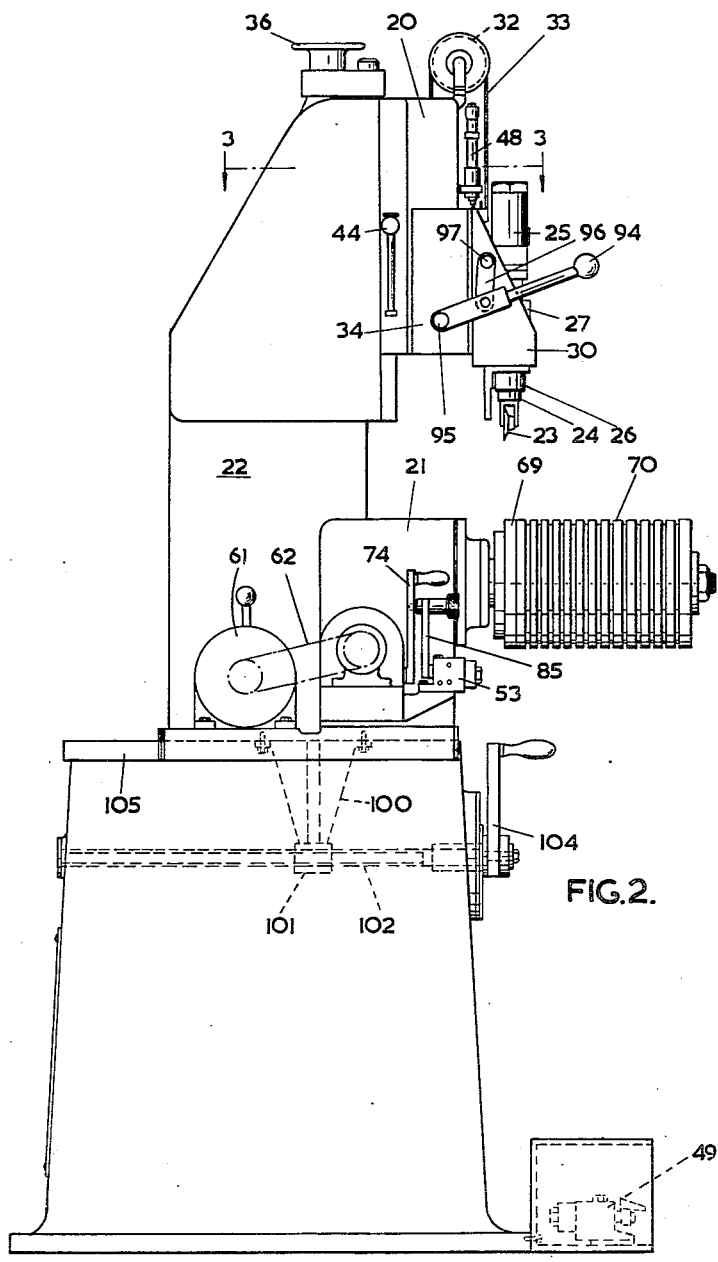
Figure 2 is a side elevation thereof.

The work-holding unit is shown in Figure 2 as having a depending bracket 100 carrying a nut 101 in engagement with a screw-threaded shaft 102 passing transversely of the machine, the screw-threaded shaft being rotatable by a handle 104 for adjusting the work-holding unit longitudinally of guideways 105.

Figure 9:
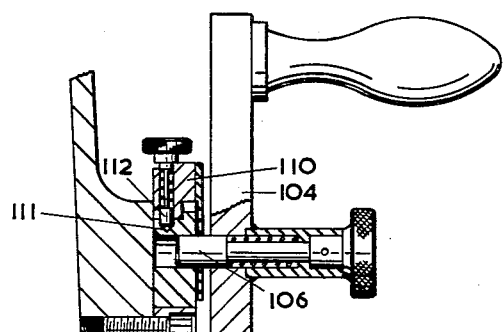
Figure 9 is a sectional elevation of an indexing means for the work-holding unit and is a section on the line 9—9 of Figure 1.
Figure 10:
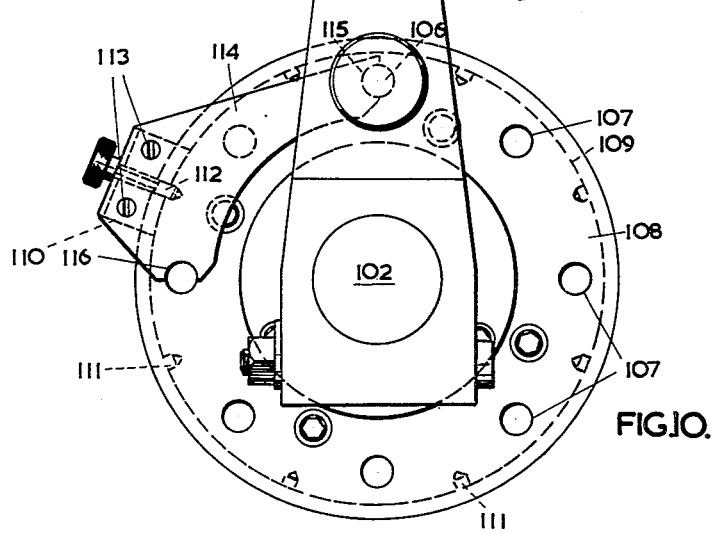
Figure 10 is a front elevation of Figure 9.

Figures 9 and 10 show a means for moving the work-holding unit 21 along its guideways to bring the successive grooves in the component vertically under the peening roller 23. For this purpose the handle 104 carries a spring-pressed plunger 106 which can be manually withdrawn from one of a series of holes 107 in a plate 108 mounted behind the lever. The plate 108 has at its outer periphery a dovetail guideway 109 in which a block 110 is mounted for sliding movement circumferentially of the plate 108. In the base of the guideway are a number of radial holes 111 into which the end of a spring-pressed plunger 112, fast with the block 110, can extend for locking the block circumferentially of the plate 108. The block 110 has mounted on its face adjacent the handle 104, by screws 113, a plate 114 which is formed at its ends with recesses forming stops 115, 116 in the path of the pin 106.

For indexing the work-holding unit along its guides to bring the next groove into register with the peening roller, the plate 114 is slid in a clockwise direction round the plate 108 until its stop 115 engages the pin 106. It is locked in that position by engaging the plunger 112 in one of the holes 111 and the pin 106 is then withdrawn and the handle 104 turned until the pin 106 engages the stop 116. In this way it can be ensured that the work-holding unit is accurately and speedily moved from one station to another. This operation is repeated for each subsequent groove.

It will be understood that the plate 114 is replaceable to accommodate components having grooves of a different longitudinal spacing.

If desired, and as shown by Figures 7 and 8, the periphery of the peening roller may be toothed. Under the pressure of the air cylinder the peening roller is maintained in contact with the wire, the high frequency vibrations of the vibrator being imposed thereon.

When applying the invention to a labyrinth strip to be received in an internal groove of a pocket, obviously the peening roller may be carried by a J-like shank, the air cylinder when energised serving to raise the peening roller into contact with the wire in the groove.

What we claim as our invention and desire to secure by Letters Patent of the United States is:

1. A machine for securing, in an undercut groove of a component, a labyrinth strip, the labyrinth strip having a channel part to be secured in the groove, and a length of wire to serve for securing the channel part in the groove, the machine including a tool head unit carrying a slide, said slide carrying a pneumatic vibrator having a guided plunger, said plunger supporting a peening roller, manual means for moving said slide to cause the peening roller to engage the wire in the channel part of the strip when the latter is in the groove of the component, fluid-pressure means for holding the slide in this position, and means for effecting rotation of the component so that the whole length of the wire can be peened by the roller, said fluid pressure means acting on and in the same line as said pneumatic vibrator whereby said peening roller is held constantly in contact with said strip and the additional hammering effect of the pneumatic vibrator is superimposed upon the constant pressure by the fluid pressure means.

2. A machine, for inserting into a groove of a component a labyrinth strip having a channel part to be secured in the groove by peening a wire into the channel part of the strip in the groove, the machine comprising a work holding unit for supporting a groove-bearing component, a tool head unit, an upwardly biassed vertically movable slide, a high-frequency vibrator, a ram, a peening roller, the peening roller being rotatably supported from the ram, the roller, vibrator and ram being carried by the slide which is movable in said head unit, the peening roller being arranged to engage the wire in the channel part of the strip when the latter is in the groove, fluid pressure means being arranged to act through the slide and in the same axial direction as the vibrator to maintain the peening roller constantly in contact with the wire throughout the peening operation, the high-frequency vibrations of the vibrator being imposed on the ram to provide a hammering effect on the wire, and means for effecting a relative movement between the roller and the groove-bearing component whereby the whole length of the wire can be peened to force the channel part of the labyrinth strip into intimate contact with the walls of said groove.

3. A machine, according to claim 2, having a guide adjacent the peening roller for leading the preformed labyrinth strip and the length of wire into the groove of the component.

4. A machine according to claim 2, in which the relativ movement is effected by rotating the component from a power drive by means of a clutch and speed-reducing gearing, including also a control for setting the vibrating means in motion, and a control for introducing the traversing movement, said two controls being placed in juxtaposition to one another so as to admit of actuation in unison.

5. A machine, according to claim 2, and in which the component has a number of axially-spaced grooves to receive labyrinth strips as aforesaid, the work-holding unit for the component having indexing means operable to bring the grooves successively into the operative position for the peening operation to be carried out.

References Cited in the file of this patent

UNITED STATES PATENTS

| | | |
|---|---|---|
| 672,261 | Chase | Apr. 16, 1901 |
| 936,481 | Scheld | Oct. 12, 1909 |
| 938,646 | Davis | Nov. 2, 1909 |
| 1,892,502 | Burd | Dec. 27, 1932 |
| 1,928,639 | Berg | Oct. 3, 1933 |
| 1,992,297 | Dewald | Feb. 26, 1935 |
| 2,026,666 | Benham | Jan. 7, 1936 |
| 2,137,358 | Shaw | Nov. 22, 1938 |
| 2,343,043 | Brugmann | Feb. 29, 1944 |
| 2,638,131 | Rohs | May 12, 1953 |
| 2,646,617 | Turoff | July 28, 1953 |

FOREIGN PATENTS

| | | |
|---|---|---|
| 519,621 | Germany | Jan. 29, 1929 |